United States Patent
Jung et al.

(10) Patent No.: US 10,334,610 B2
(45) Date of Patent: Jun. 25, 2019

(54) METHOD, CARRIED OUT BY USER EQUIPMENT, FOR TRANSMITTING PRIORITY INFORMATION IN WIRELESS COMMUNICATION SYSTEM AND USER EQUIPMENT UTILIZING THE METHOD

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/564,724

(22) PCT Filed: Apr. 11, 2016

(86) PCT No.: PCT/KR2016/003806
§ 371 (c)(1),
(2) Date: Oct. 5, 2017

(87) PCT Pub. No.: WO2016/163859
PCT Pub. Date: Oct. 13, 2016

(65) Prior Publication Data
US 2018/0110054 A1    Apr. 19, 2018

Related U.S. Application Data

(60) Provisional application No. 62/145,459, filed on Apr. 9, 2015, provisional application No. 62/144,965, filed on Apr. 9, 2015.

(51) Int. Cl.
H04W 72/08    (2009.01)
H04W 72/12    (2009.01)
(Continued)

(52) U.S. Cl.
CPC ......... *H04W 72/085* (2013.01); *H04W 72/02* (2013.01); *H04W 72/048* (2013.01); *H04W 72/1242* (2013.01); *H04W 72/10* (2013.01)

(58) Field of Classification Search
None
See application file for complete search history.

(56) References Cited

U.S. PATENT DOCUMENTS

2012/0207096 A1    8/2012  Maheshwari et al.
2014/0321377 A1*  10/2014  Ryu ................. H04W 72/1247
                                                                  370/329

(Continued)

FOREIGN PATENT DOCUMENTS

WO    2015003153    1/2015
WO    2015046972    4/2015

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 8)," 3GPP TS 36.304 V8.5.0, Mar. 2009, 30 pages.

(Continued)

*Primary Examiner* — Hong S Cho
(74) *Attorney, Agent, or Firm* — Lee, Hong, Degerman, Kang & Waimey

(57) ABSTRACT

Provided are a method, carried out by a user equipment (UE), for transmitting priority information in a wireless communication system and a UE utilizing the method. The method is characterized by selecting a priority for data to be transmitted by means of a device-to-device (D2D) action, associating the value for the selected priority with the data, and transmitting the data and value for the selected priority.

14 Claims, 21 Drawing Sheets

(51) Int. Cl.
*H04W 72/04* (2009.01)
*H04W 72/02* (2009.01)
*H04W 72/10* (2009.01)

(56) References Cited

U.S. PATENT DOCUMENTS

2015/0045018 A1   2/2015  Liu et al.
2016/0183276 A1*  6/2016  Marinier ............... H04W 72/02
                                                       370/329
2017/0013640 A1*  1/2017  Loehr ................... H04W 76/14

OTHER PUBLICATIONS

PCT International Application No. PCT/KR2016/003806, Written Opinion of the International Searching Authority dated Jul. 26, 2016, 6 pages.

* cited by examiner

METHOD, CARRIED OUT BY USER EQUIPMENT, FOR TRANSMITTING PRIORITY INFORMATION IN WIRELESS COMMUNICATION SYSTEM AND USER EQUIPMENT UTILIZING THE METHOD

CROSS-REFERENCE TO RELATED APPLICATIONS

This application is the National Stage filing under 35 U.S.C. 371 of International Application No. PCT/KR2016/003806, filed on Apr. 11, 2016, which claims the benefit of U.S. Provisional Application No. 62/144,965, filed on Apr. 9, 2015, and 62/145,459, filed on Apr. 9, 2015, the contents of which are all hereby incorporated by reference herein in their entirety.

BACKGROUND OF THE INVENTION

Field of the Invention

The present invention relates to a wireless communication, more particularly a method, carried out by user equipment, for transmitting priority information in wireless communication system and user equipment utilizing the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3$^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

On the other hand, when the UE is desired to send data to other terminals by a D2D action, there may be various kinds for the data, in terms of importance/emergency status/purpose or the like. For example, in an emergency or disaster situation, it would be desirable that the data which is sent by the terminal to the other terminal through the D2D action is preferentially transmitted and its QoS (Quality of Service) is higher than transmitting simple user data.

In addition, there may be also various kinds of target terminals which are subject to data transmission, depending on its importance/emergency status/purpose.

As such, on the premise that there may be various kinds of data and target terminals to be desired to transfer through various D2D actions, a method and apparatus for ensuring the QoS of the D2D action is required.

SUMMARY OF THE INVENTION

Technical subject to be solved in the present invention is to provide a method of transmitting priority information performed by a terminal in a wireless communication system and the terminal using the same.

In one aspect, provided is a method, carried out by a user equipment (UE), for transmitting priority information in a wireless communication system. The method includes selecting a priority for data to be transmitted by means of a device-to-device (D2D) action, associating the value for the selected priority with the data and transmitting the data and value for the selected priority.

The data and the value for the selected priority may be transmitted to other terminal by the D2D action.

The value for the selected priority may be transmitted to a network.

The priority may be selected as a packet data unit.

The value for the priority may be selected among a plurality of values.

When a priority for the data is changed, a value for the changed priority may be transmitted to a network.

In another aspect, provided is a terminal. The terminal includes a radio frequency (RF) unit configured to transmit and receive a radio signal and a processor couple to the RF unit. The processor selects a priority for data to be transmitted by means of a device-to-device (D2D) action, associates the value for the selected priority with the data, and transmits the data and value for the selected priority.

According to the present invention, the terminal can inform other terminals or the network of data to be transmitted through the D2D action or information on the priorities of other terminals receiving the data. In addition, data can be transmitted by selecting an appropriate resource in consideration of the priority. As a result, the QoS of the D2D action can be enhanced.

DESCRIPTION OF EXEMPLARY EMBODIMENTS

Figure 1:
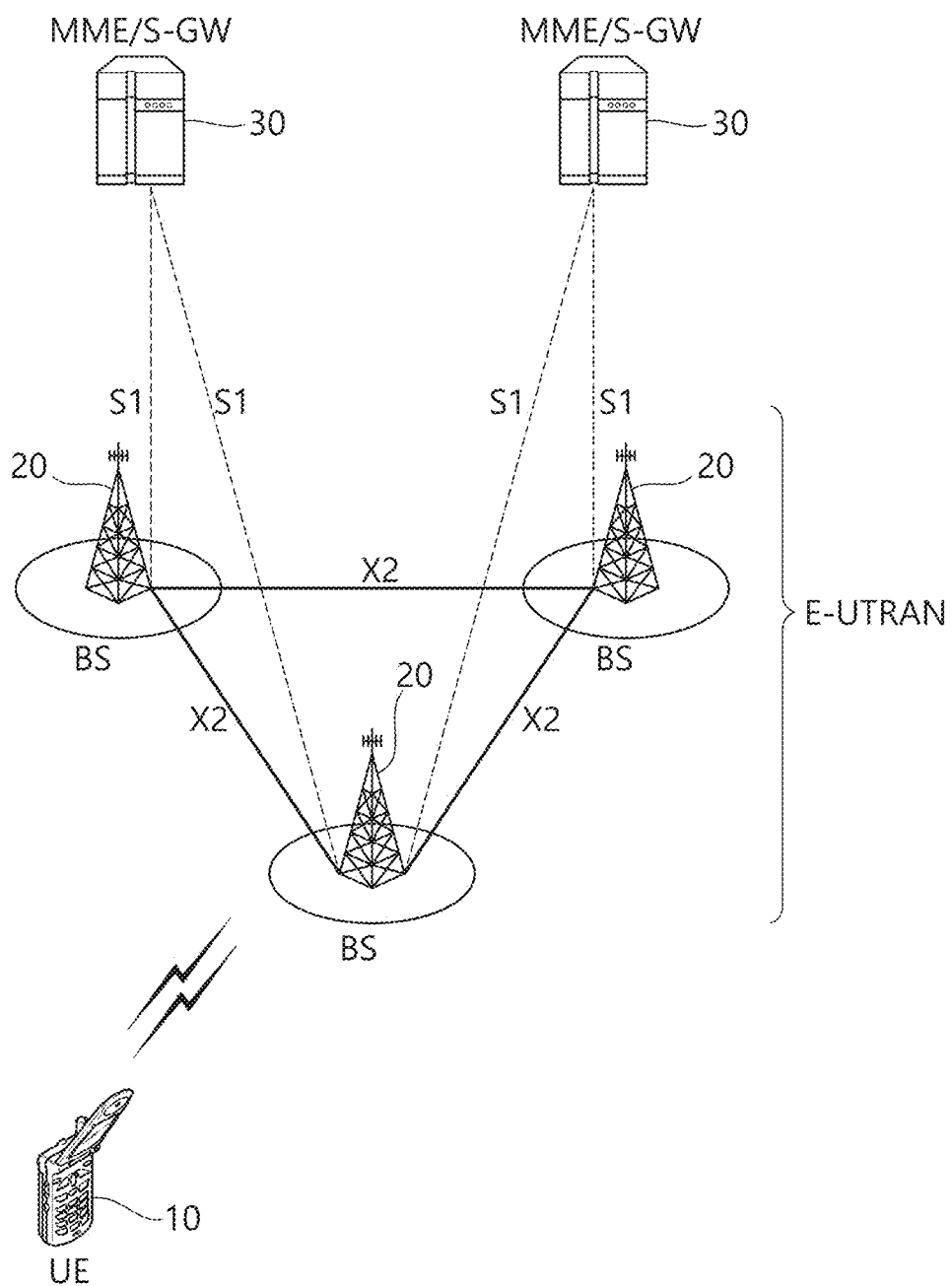
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
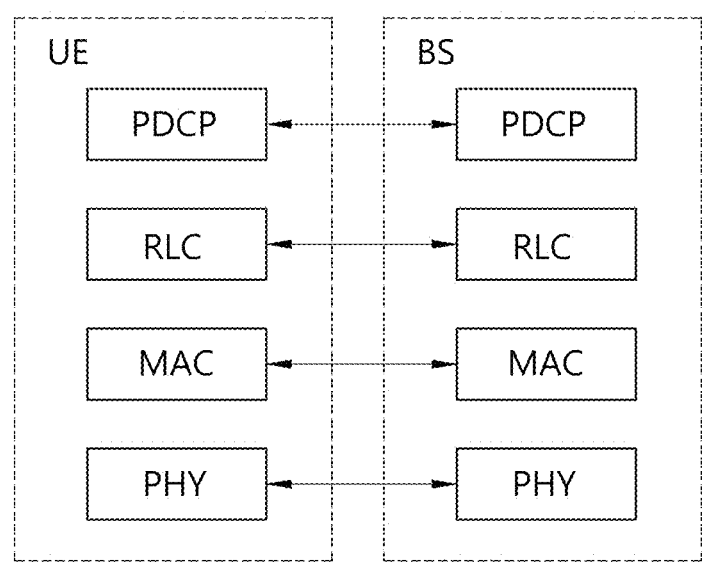
FIG. 2 is a diagram showing a wireless protocol architecture for a user plane.
Figure 3:
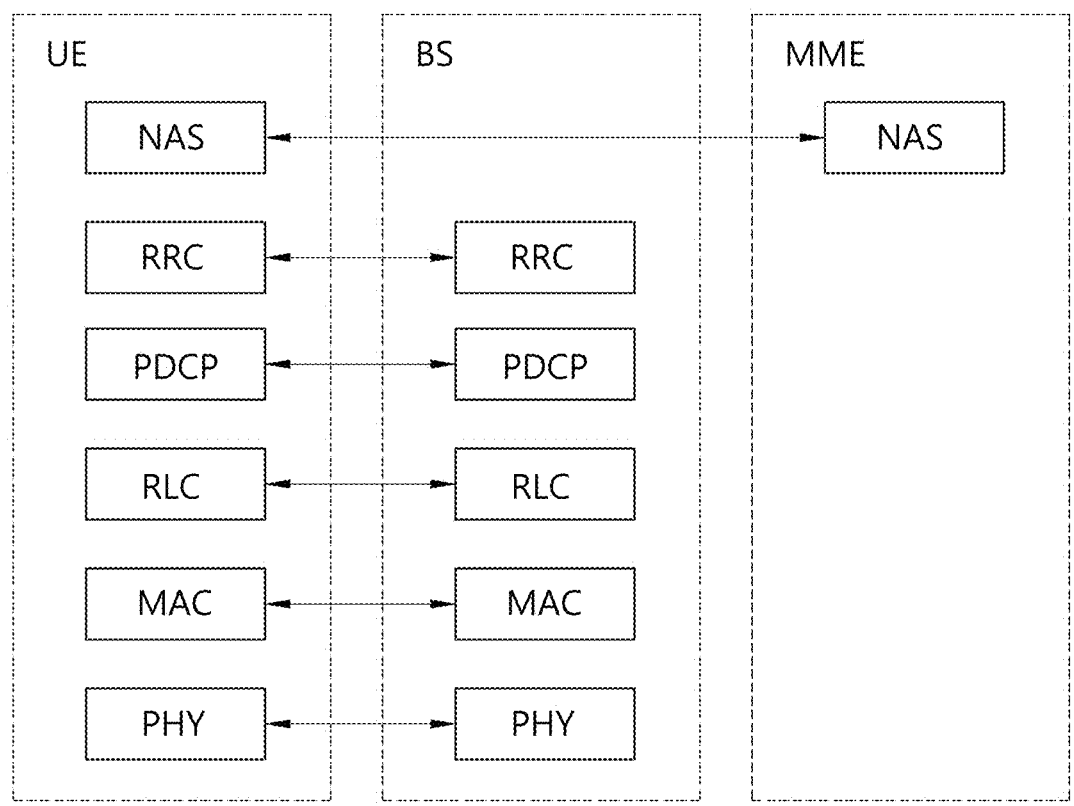
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
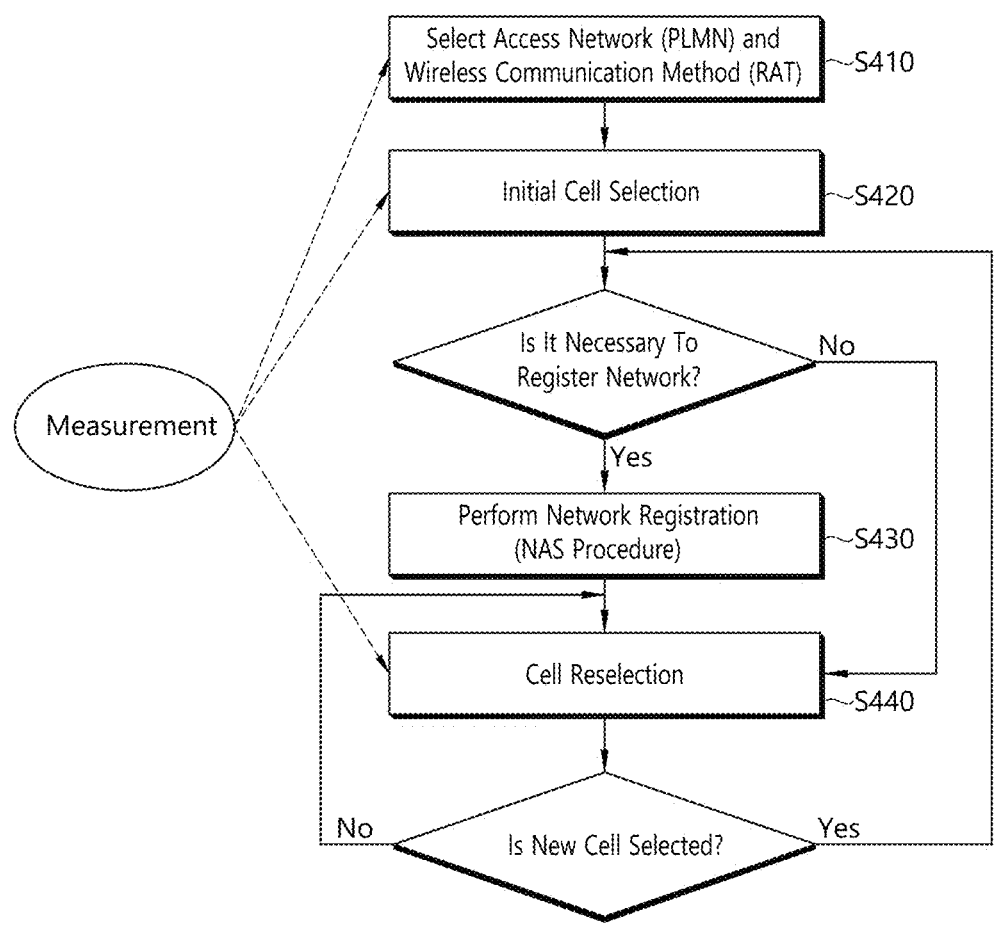
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
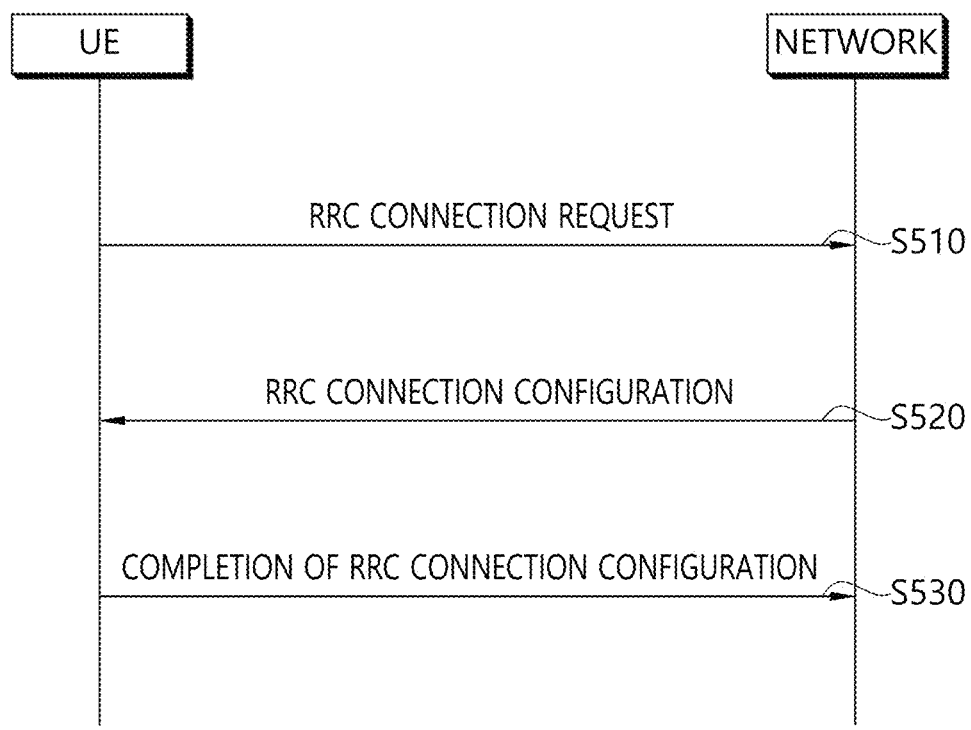
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
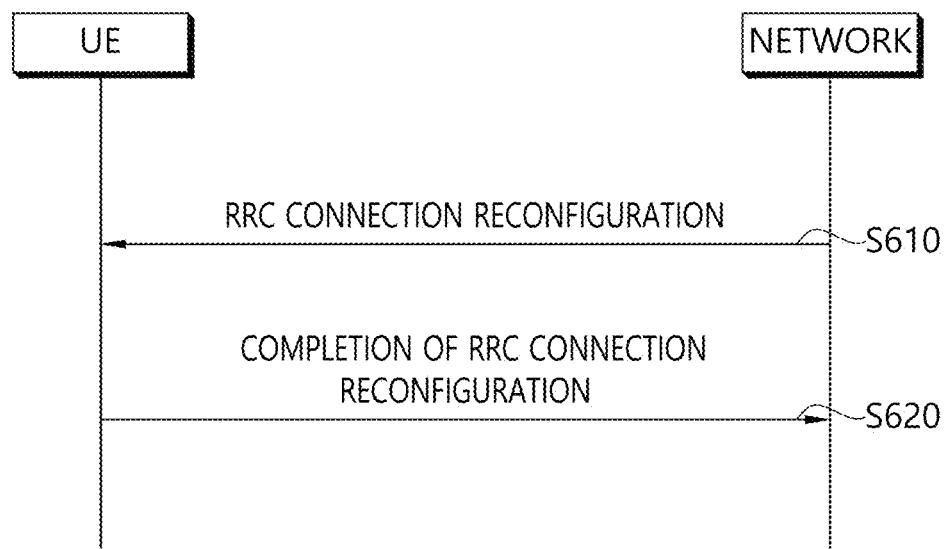
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev>0 \text{ AND } Squal>0 \qquad \text{[Equation 1]}$$

where:

$Srxlev=Q_{rxlevmeas}-(Q_{rxlevmin}+Q_{rxlevminoffset})-Pcompensation$ $Squal=Q_{qualmeas}-(Q_{qualmin}+Q_{qualminoffset})$ Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

- Intra-frequency cell reselection: UE reselects a cell having the same center frequency as that of RAT, such as a cell on which the UE camps on.
- Inter-frequency cell reselection: UE reselects a cell having a different center frequency from that of RAT, such as a cell on which the UE camps on
- Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Q\text{meas},s + Q\text{hyst}, Rn = Q\text{meas},s - Q\text{offset} \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

- A case where UE determines that there is a serious problem in the quality of a downlink communication link (a case where the quality of a PCell is determined to be low while performing RLM) based on the radio quality measured results of the PHY layer of the UE
- A case where uplink transmission is problematic because a random access procedure continues to fail in the MAC sublayer.
- A case where uplink transmission is problematic because uplink data transmission continues to fail in the RLC sublayer.
- A case where handover is determined to have failed.
- A case where a message received by UE does not pass through an integrity check.

An RRC connection re-establishment procedure is described in more detail below.

Figure 7:
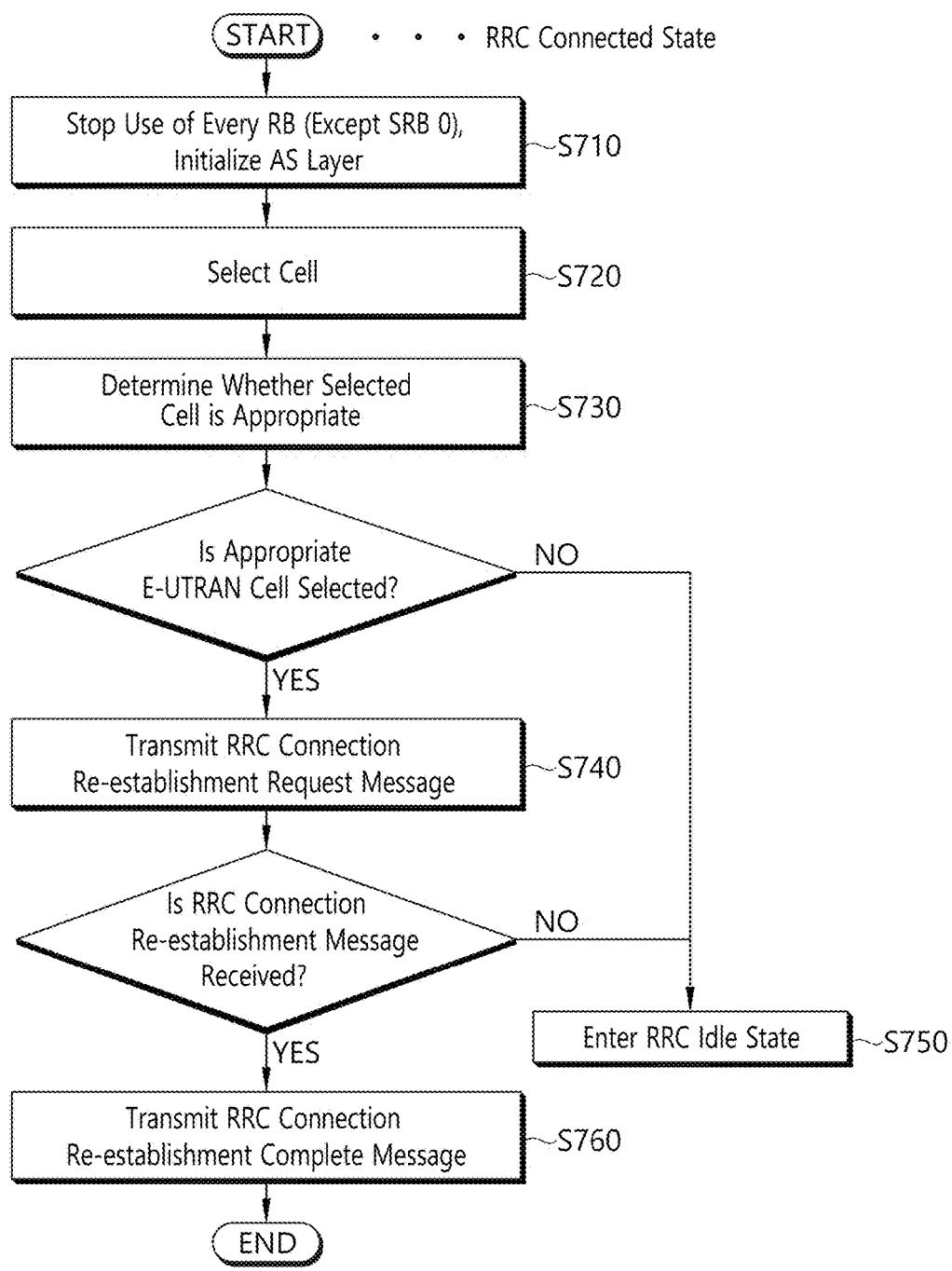
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
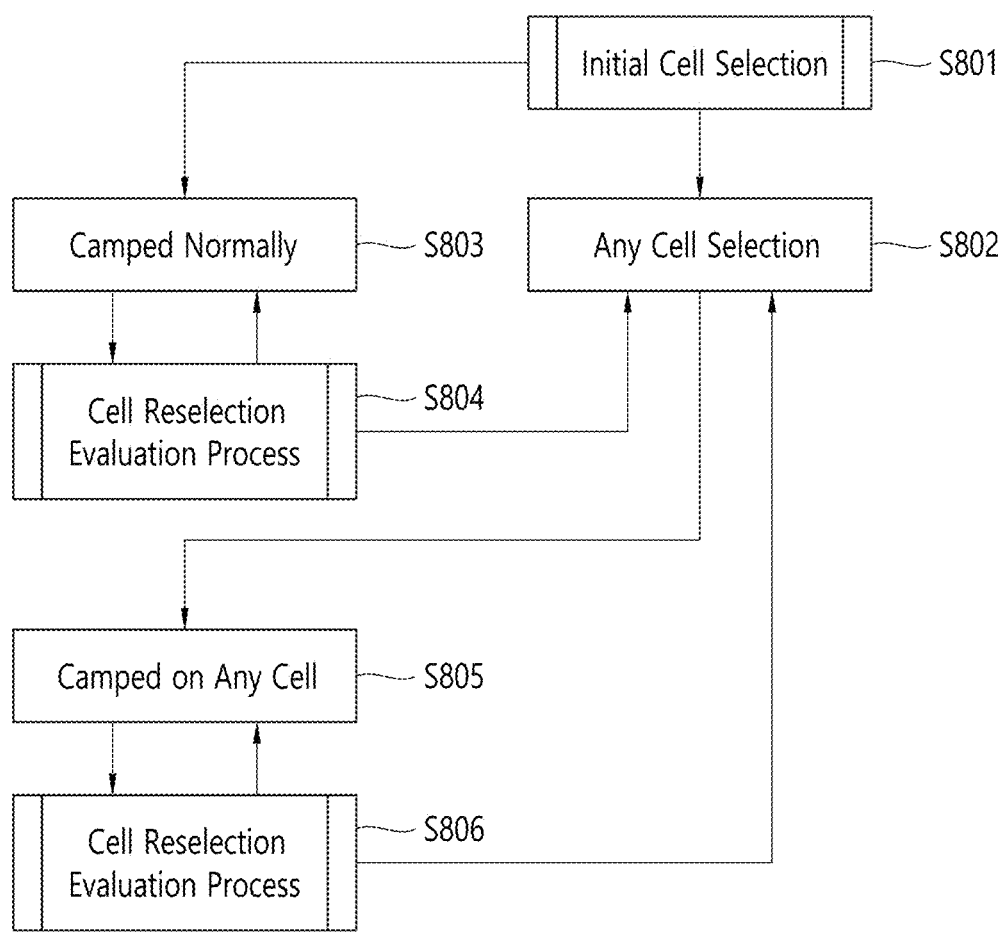
FIG. 8 illustrates substrates which may be owned by UE in the RRC_IDLE state and a substrate transition process.

FIG. 8 illustrates substrates which may be owned by UE in the RRC_IDLE state and a substrate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery. The D2D action may be a concept collectively referred to as D2D communication and D2D discovery.

Figure 9:
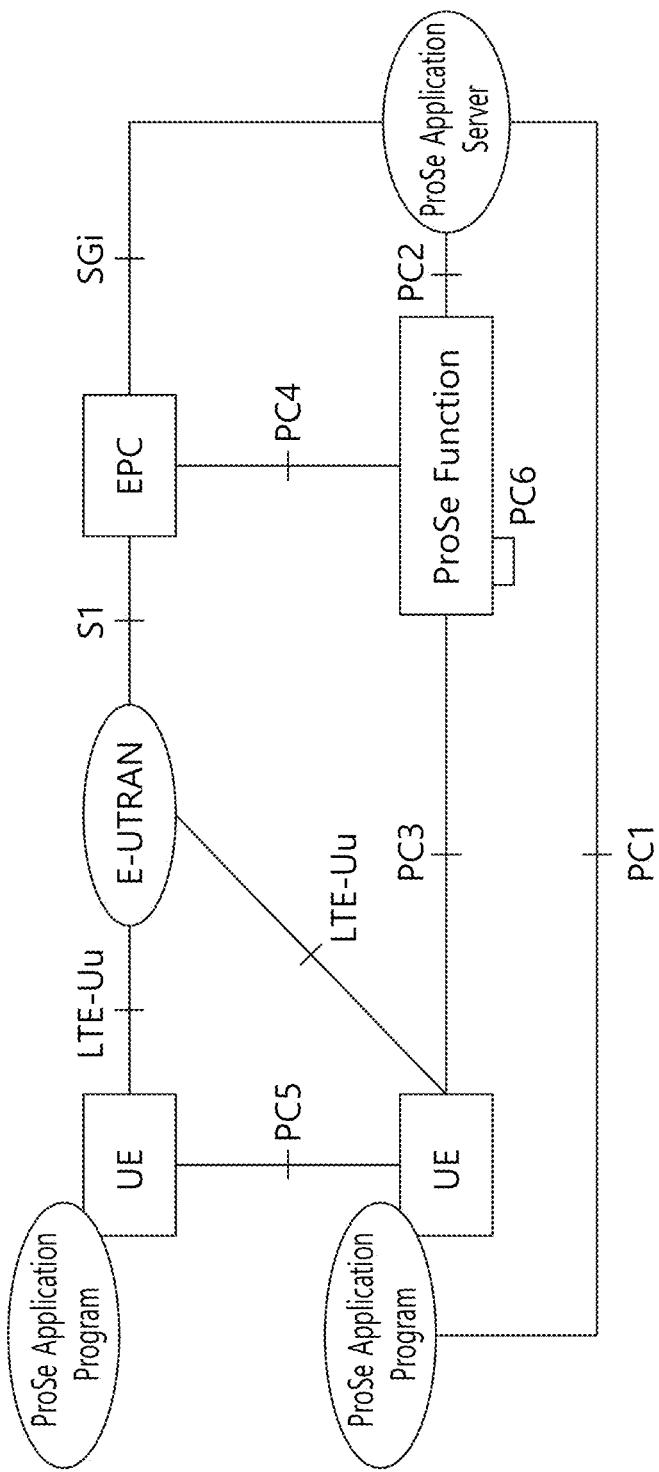
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
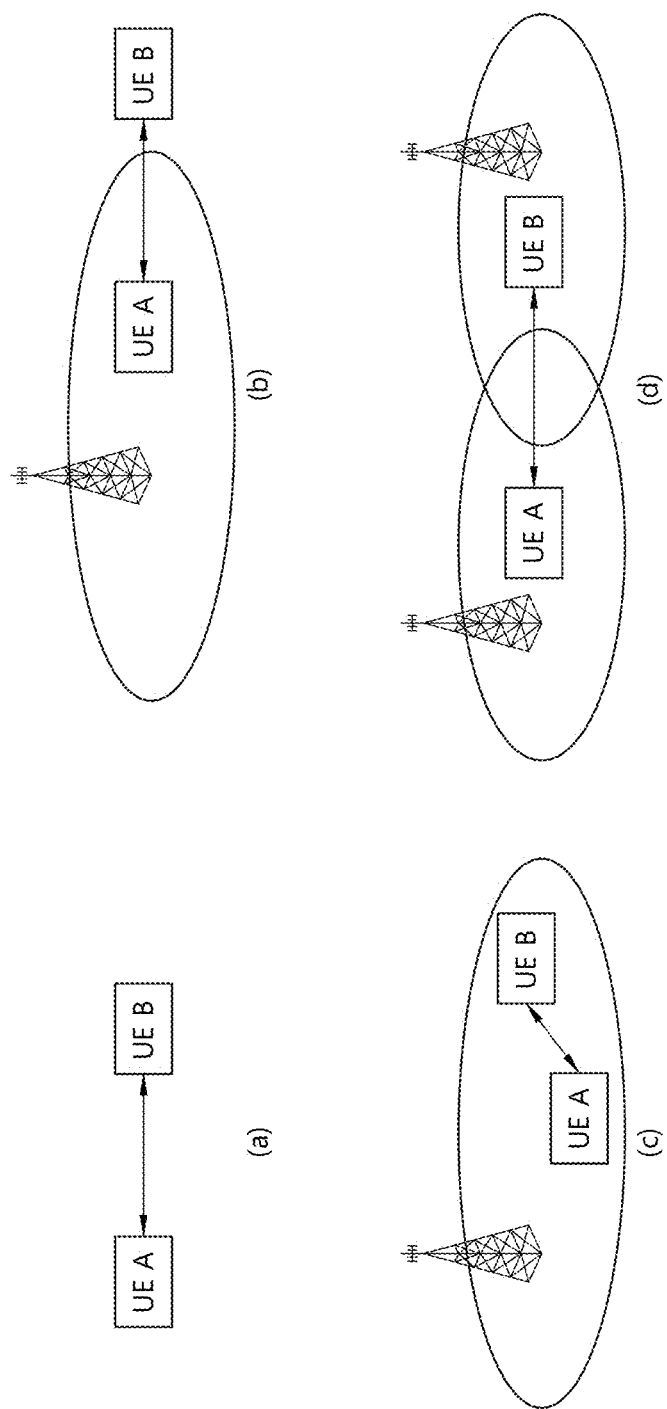
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
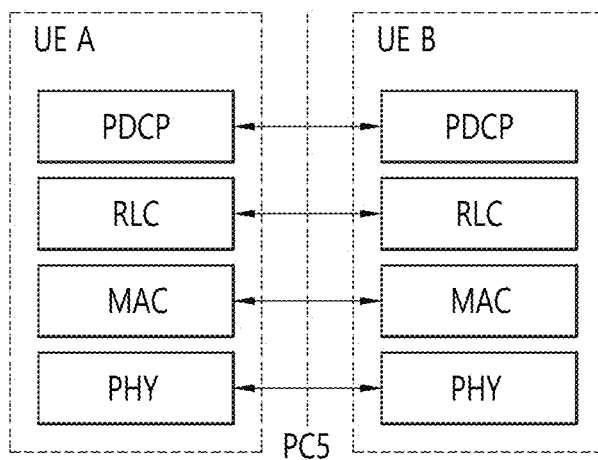
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
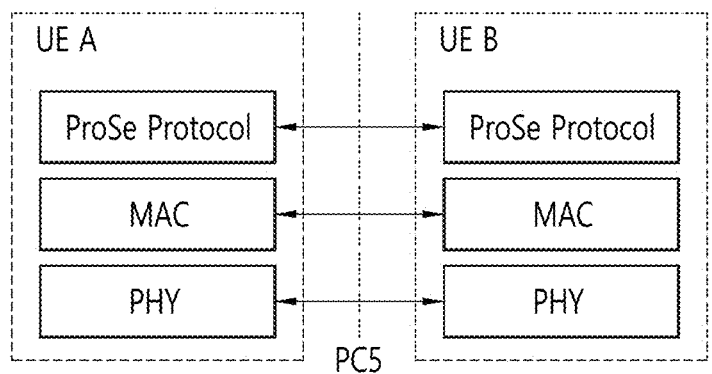
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration (setting) for discovery information announcement to types of UE. This configuration (setting) may be included in a system information block (SIB) and signaled in a broadcast manner. Alternatively, the setting may be provided in the UE-specific RRC message. Alternatively, the setting may be a broadcast signaling of different layer other than the RRC message or the UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
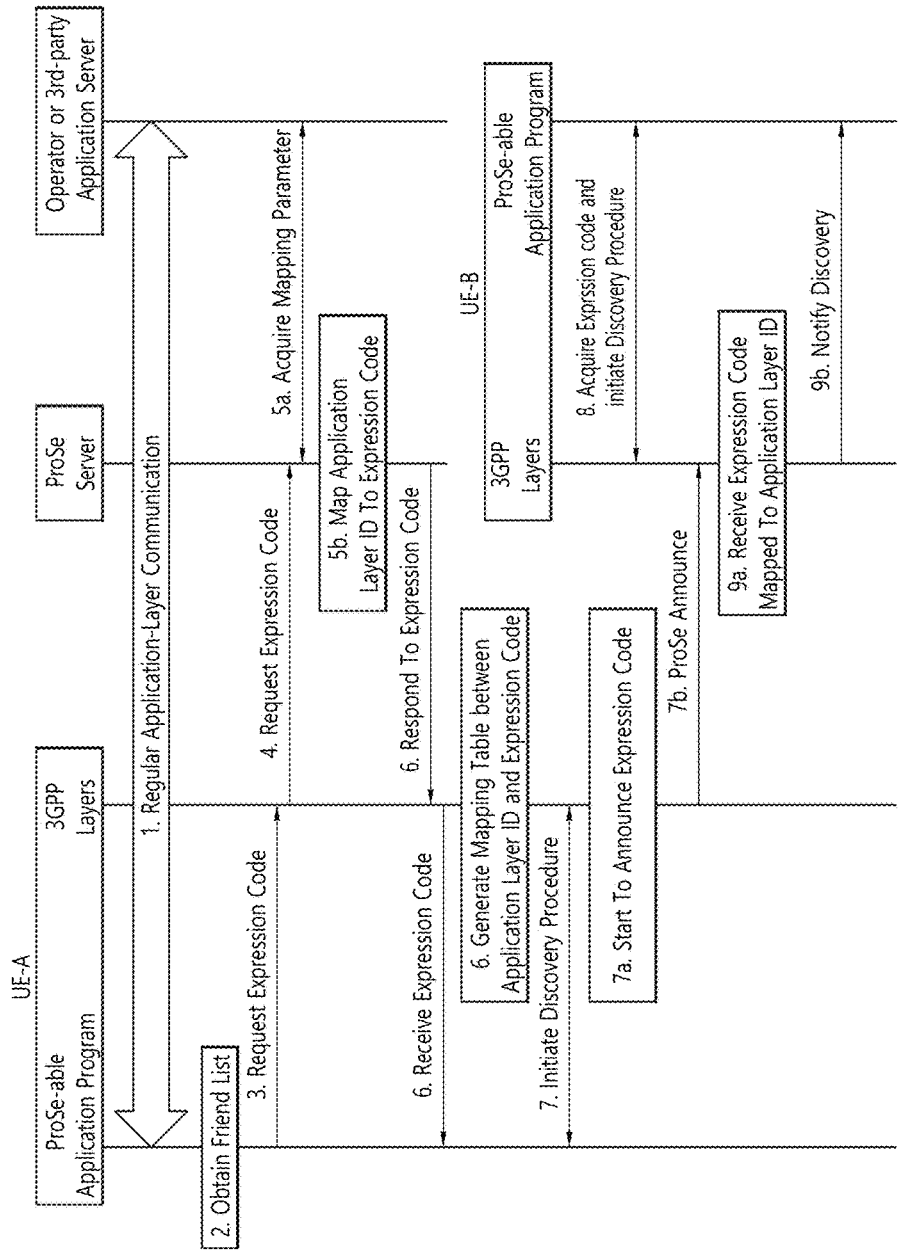
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
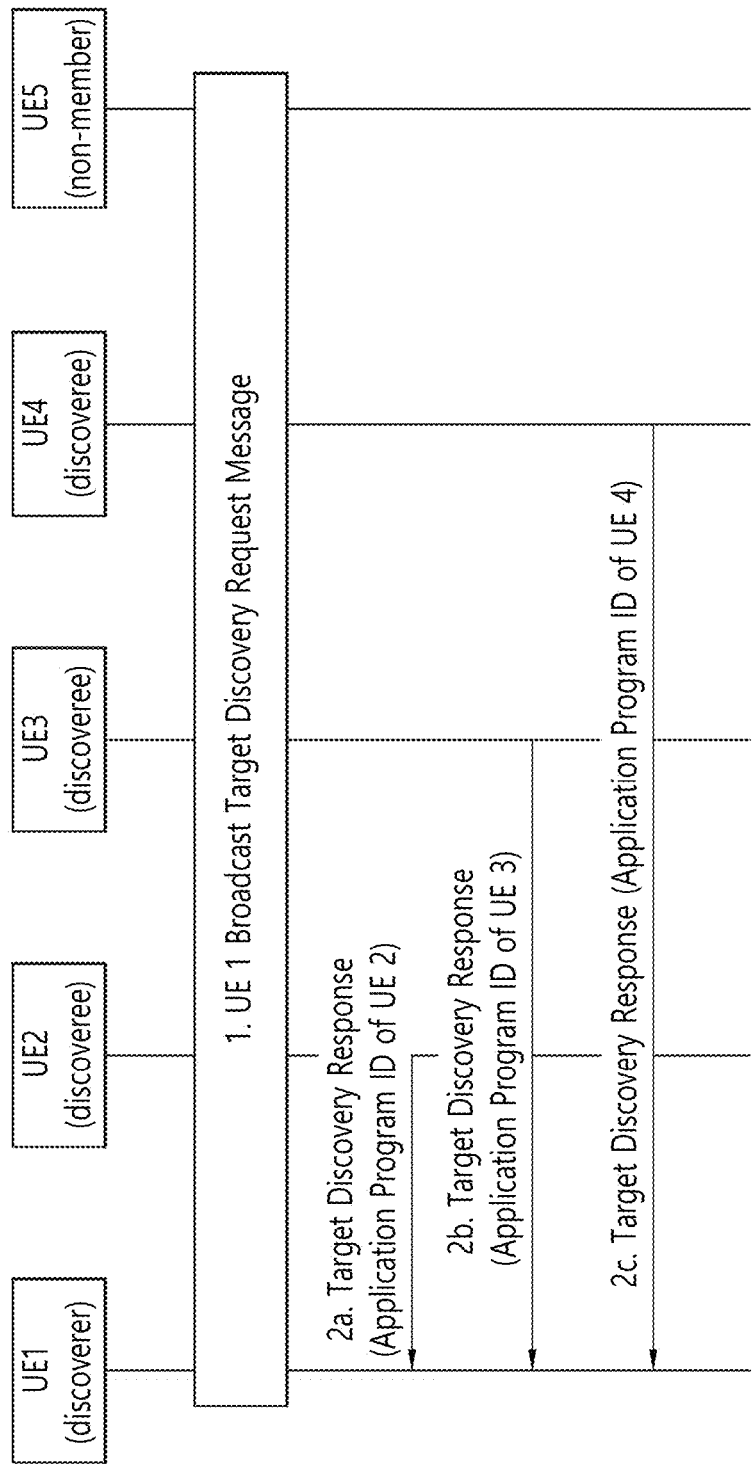
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

The present invention will now be described.

The D2D action may be performed between a terminal and other terminal, and an interface between the terminal and other terminal may be referred to as a sidelink, and a PC5 interface corresponds to the sidelink. Hereinafter, the D2D action includes the above-mentioned D2D communication and D2D discovery. The D2D communication can be referred to as a ProSe direct communication, sidelink communication or simply communication. The D2D discovery may be referred to as a ProSe direct discovery, sidelink discovery, or simply discovery.

The network may provide the terminal with a list of D2D resource pools. The resource pool may be a D2D transmission resource pool that can be used to transmit the D2D signal. For example, the resource pool may be a D2D transmission resource pool capable of performing LTE based D2D transmission. The terminal may select a specific resource in the resource pool on its own and transmit the D2D signal. When a plurality of D2D resource pools are provided as described above, a method in which the D2D resource pool (hereinafter simply referred to as a resource pool) can be efficiently selected, will be described.

Figure 15:
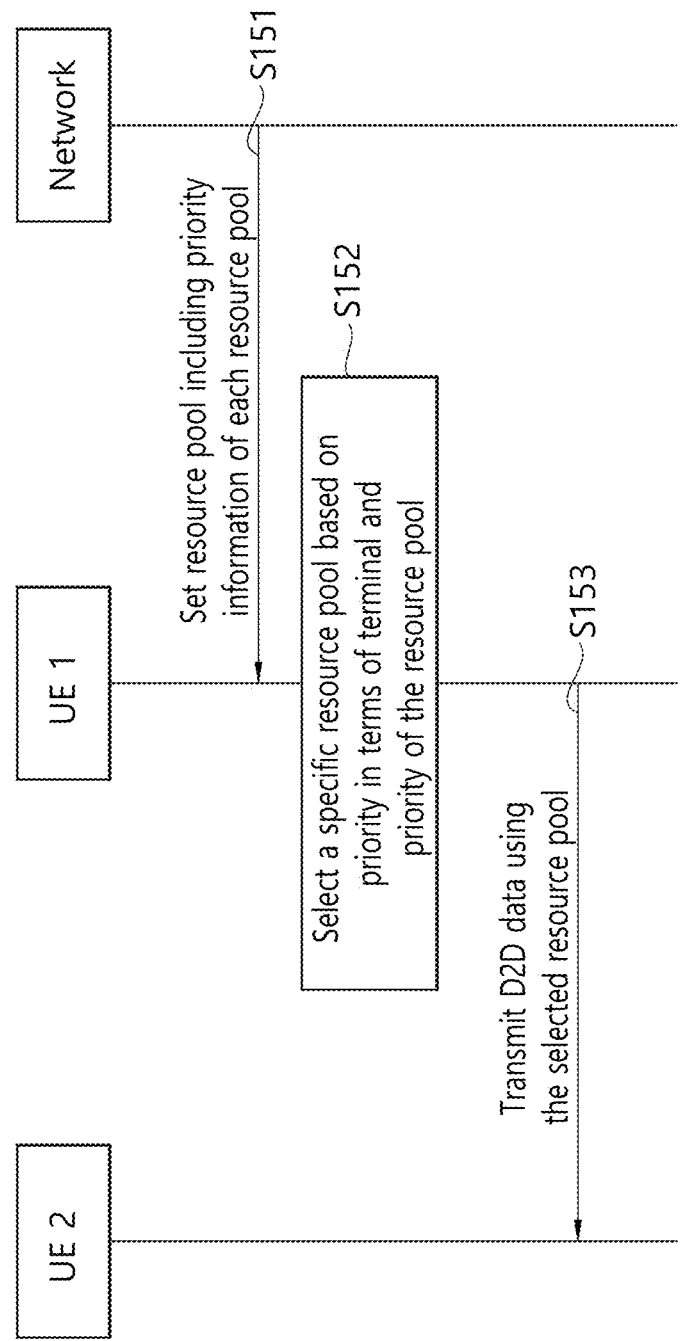
FIG. 15 shows a D2D action method of a terminal according to an embodiment of the present invention.

FIG. 15 shows a D2D action method of a terminal according to an embodiment of the present invention.

Referring to FIG. 15, the network provides a terminal 1 with a resource pool setting including priority information of each resource pool (S151). The resource pool setting can set a plurality of resource pools to the UE and can provide priority information for each resource pool.

The priority information of each resource pool may be provided in the form of an index. That is, for each resource pool, the network can provide an index.

For example, suppose that the resource pools provided by the network through resource pool setting are resource pools 1, 2, and 3. In this case, the network informs the terminal 1 of the priority that can be applied to each of the resource pools 1, 2, and 3 through the priority information of each resource pool. In this case, the priority indicates not only which resource pool has a higher priority among resource pools 1, 2 and 3, but also, for each resource pool, whether which terminal, which group of terminals or which transmission data can use the corresponding resource pool or not. The transmission data may be D2D data transmitted by the D2D action. The priority information for each resource pool can be used to indicate the priority of the D2D data that can use each of the plurality of resource pools.

For example, suppose that a priority of resource pool 1 is n, a priority of resource pool 2 is m, and a priority of resource pool 3 is k. In this case, although the priorities n, m, and k represent the relative priorities among the resource pools 1, 2, and 3, it may also represent the priority of the terminal/terminal group/transmission data. For example, when there is a plurality of transmission data and a priority is allocated to each transmission data, the priority of a specific transmission resource pool may indicate the priority of transmission data that can use the specific transmission resource pool.

The network can provide resource pools and corresponding indexes through system information.

The following table shows an example of the system information which informs resource pools and indexes.

TABLE 2

ProseCommConfig information element

```
-- ASN1START
ProseCommConfig-r12 ::=  SEQUENCE    {
    commTxResources-r12                                     CHOICE {
            release                       NULL,
            setup                         CHOICE {
            scheduled-r12                 SEQUENCE {
            sl-RNTI-r12                   C-RNTI,
            bsr-Config-r12                ProseBSR-Config-r12,
            commTxConfig-r12              ProseCommResourcePool-r12,
            mcs-r12          INTEGER (0..28)                OPTIONAL    -- Need OP
              },
             ue-Selected-r12                                SEQUENCE {
                            -- Pool for normal usage
                            commTxPoolNormalDedicated-r12       SEQUENCE {
               poolToReleaseList-r12    ProseTxPoolToReleaseList-r12 OPTIONAL, --
Need ON
               poolToAddModList-r12    ProseCommTxPoolToAddModList-r12
OPTIONAL         -- Need ON
                }
              }
            }
    }
                                                    OPTIONAL,     -- Need ON
    ...
}
ProseCommTxPoolToAddModList-r12 ::=              SEQUENCE (SIZE (1..maxProseTxPool-
r12)) OF ProseCommTxPoolToAddMod-r12
ProseCommTxPoolToAddMod-r12 ::=                  SEQUENCE    {
    poolIdentity-r12                                 ProseTxPoolIdentity-r12,
    pool-r12
    ProseCommResourcePool-r12
}
ProseBSR-Config-r12 ::=        SEQUENCE        {
    periodicBSR-Timer              ENUMERATED {
                                   sf5, sf10, sf16, sf20, sf32, sf40, sf64, sf80,
                                   sf128, sf160, sf320, sf640, sf1280, sf2560,
                                   infinity, spare1},
    retxBSR-Timer                  ENUMERATED {
                                   sf320, sf640, sf1280, sf2560, sf5120,
                                   sf10240, spare2, spare1}
}
-- ASN1STOP
```

In Table 2, the 'ProseCommConfig' specifies dedicated setting information for ProSe direct communication: D2D communication, and particularly relates to transmission resource setting for D2D communication at the primary frequency.

In Table 2, 'ProseCommResourcePool' can indicate a plurality of resource pools for D2D communication and can include setting information for each resource pool. Table 3 below shows an example of 'ProseCommResourcePool'.

TABLE 3

```
-- ASN1START
ProseCommPoolList4-r12 ::=     SEQUENCE  (SIZE  (1..maxProseTxPool-r12))     OF
ProseCommResourcePool-r12
ProseCommPoolList16-r12 ::=          SEQUENCE  (SIZE  (1..maxProseRxPool-r12))    OF
```

TABLE 3-continued

```
ProseCommResourcePool-r12
ProseCommResourcePool-r12 ::=        SEQUENCE        {
   sc-CP-Len-r12                     Prose-CP-Len-r12,
   sc-Period-r12                     ENUMERATED {sf40, sf60, sf70, sf80, sf120, sf140,
                                           sf160, sf20, sf260, sf280, sf320},
   sc-TF-ResourceConfig-r12             Prose-TF-ResourceConfig-r12,
   data-CP-Len-r12                      Prose-CP-Len-r12,
   dataHoppingConfig-r12                Prose-HoppingConfigComm-r12,
   ue-SelectedResourceConfig            SEQUENCE {
   -- Parameters not used in case of scheduled Tx config
      data-TF-ResourceConfig            Prose-TF-ResourceConfig-r12,
      trpt-Subset-r12                   BIT STRING (SIZE (3..5))      OPTIONAL   -- Need OR
   }
                                       OPTIONAL,          -- Need OR
   rx-ParametersNCell                  SEQUENCE {
      tdd-Config-r12                   TDD-Config         OPTIONAL,   -- Need OR
      sync-ConfigIndex-r12                                INTEGER (0..15)
   }
                                       OPTIONAL,          -- Need OR
   tx-Parameters                                    SEQUENCE {
      sc-TxParameters-r12                           Prose-TxParameters-r12,
      dataTxParameters-r12                          Prose-TxParameters-r12
   }
                                       OPTIONAL,          -- Need OR
   ProseCommResourceIndexList
      ...
}
Prose-CP-Len-r12 ::=                 ENUMERATED {normal, extended}
Prose-HoppingConfigComm-r12 ::=      SEQUENCE        {
   hoppingParameter-r12                              INTEGER (0..504),
   numSubbands-r12                                   ENUMERATED {ns1, ns2, ns4},
   rb-Offset-r12                                     INTEGER (0..110)
}
-- ASN1STOP
```

In Table 3, the 'ProseCommPoolList4' is a list that can include 'maxProseTxPool' by the number of 'ProseCommResourcePool' and specifies resources related to transmitting signal related to D2D communication. The 'ProseCommPoolList16' is a list that can contain 'maxProseRxPool' by the number of 'ProseCommResourcePool' and specifies resources related to receiving signals related to D2D communication.

The 'ProseCommResourcePool' included in each list includes 'ProseCommResourceIndexList', which indicates the index described above. The field indicating the index may be included when 'ProseCommResourcePool' indicates a transmission pool. If the 'ProseCommResourcePool' indicates a reception pool, then the network may not include the field ('ProseCommResourceIndexList'), which is possible to reduce the signaling overhead. If the 'ProseCommResourcePool' indicates the reception pool, then it is possible to indicate the reception pool of the specific priority through the field ('ProseCommResourceIndexList') in order to ensure that the terminal necessarily monitors the pool of a specific priority.

The terminal 1 selects a specific resource pool based on the priority in terms of the terminal and the priority of the resource pool (S152).

The priority in terms of the terminal may be the group priority of the group to which the terminal belongs, the priority of the D2D data desired to be transmitted by the terminal, and the priority of the target terminal/target terminal group to which the terminal desires to transmit the D2D data and the like. When the terminal 1 is to transmit the D2D data to the terminal 2, the terminal 2 becomes the target terminal in the position of the terminal 1. The target terminal may be referred to as a destination terminal.

The terminal 1 transmits D2D data to the terminal 2 using the selected resource pool (S153).

Hereinafter, steps S151 to S153 will be described in more detail.

A terminal may belong to one or a plurality of groups. Each group may have its priority (referred to be group priority). For example, a group 1 may have a group priority N, a group 2 may have a group priority M, and a group 3 may have a group priority L (L, N, and M are natural numbers).

It is assumed that the network knows which group each terminal belongs to and also the priority of that group. If the network provides a plurality of D2D transmission resource pools through system information (e.g., SIB 18), then it can be one of methods that makes D2D communications associated with different group priorities use the D2D transmission resource pool allowed for that group priority. For example, when a terminal belonging to group 1 (group priority N) attempts to perform the D2D communication, it makes a specific D2D transmission resource pool allowed for the group priority N to be used among a plurality of D2D transmission resource pools. This may be a prioritization of resource pools based on group priority.

Through prioritization of resource pools based on group priorities, more important D2D communications can use higher priority resource pools. In general, if the resource pool associated with that priority is selected based on the priority of the data to be transmitted, then the D2D communication quality can be improved.

The network can inform the terminal of the priority associated with each resource pool. For example, by providing one or more indexes per resource pool, the priority associated with the resource pool may be informed. Alternatively, if one resource pool can be divided into more detailed sub-resource pools, then an index may be provided for each sub-resource pool.

When the terminal desires to perform D2D transmission, it needs to select an appropriate resource to use on its own. In the present invention, as described above, a specific resource pool is selected based on the priority in terms of the terminal (e.g., priority of D2D data transmission to be transmitted by the terminal) and priority of the resource pool.

There are a variety of methods that can be used when a terminal selects a specific resource pool, the methods below can be considered 1. Consider Only the Priority of the Terminal.

That is, a method of selecting a resource pool by considering only the priority of the terminal or the group priority of the terminal group to which the terminal belongs.

2. Method for Considering the Priority of a Destination Terminal or a Destination Terminal Group of a Corresponding D2D Communication Transmission.

When the terminal 1 transmits data by D2D communication to the terminal 2, the terminal group to which the terminal 2 belongs becomes the destination terminal group. The terminal 1 can select a resource pool depending on the group priority of the terminal 2.

3. How to Select a Resource Pool Considering the Priority of Data Transmitted by the Terminal When the priority of the data transmitted by the terminal is known, the terminal selects the resource pool granted to transmit the data of the corresponding priority. For example, when there is general data to be transmitted using D2D communication by a terminal to other terminal, and D2D data to data to be transmitted using D2D communication by a terminal performing public safety actions in an urgent situation such as a disaster situation to other terminal, it can make the terminal performing the public safety action allocate higher priority to the D2D data to be transmitted and the D2D data be transmitted using the higher priority resource pool. The terminal performing the public safety action transmits D2D data using a resource pool with a higher priority to the data having higher priority among the data transmitted by the terminal performing the public safety action and thus increases transmission reliability of the data with higher priority.

4. A Method of Considering the Priority of the Terminal and the Priority of the Destination Terminal/the Priority of the Destination Terminal Group Together.

For example, a higher priority among a priority of a terminal that transmits D2D data and a priority of a destination terminal group that receives D2D data may be considered, or a higher priority among a priority of a group to which a terminal that transmits D2D data belongs, a priority of the destination terminal group receiving the D2D data may be considered. Alternatively, when the D2D data to be transmitted by the terminal is multiplexed data having different priorities, the highest priority may be considered as the priority of the D2D data to be transmitted by the terminal. When it is generalized, the highest priority can be considered if a plurality of priorities is associated with the corresponding D2D data transmission.

The terminal can determine whether the resource pool can be used by comparing a higher priority among the priority of the terminal and the priority of the destination terminal group with a priority of the resource pool.

D2D transmission of the D2D data having a specific priority in terms of D2D transmission data may be transmitted using a transmission resource pool having the same priority as the specific priority among the priorities in terms of transmission resources. This method is applicable when the network sets an available resource pool for all priorities that may occur from the terminal.

Alternatively, a D2D transmission belonging to a particular priority may use a D2D transmission resource pool associated with the same or a lower priority. That is, when the terminal performs the D2D transmission having the specific priority, the use of the transmission resource pool having the same priority and the lower priority than the priority as the specific priority is allowed, but the D2D transmission resource pools that are set to be used for D2D transmission with higher priority than the specific priority are unavailable.

When there is a plurality of D2D transmission resource pools that can be used for D2D transmission through comparison of priorities, the terminal can arbitrarily select from among them.

On the other hand, if priority information is not provided for the D2D transmission resource pool, then the priority-related restriction is not applied. That is, a D2D transmission belonging to any priority can use that resource pool.

The network may set which method the terminal uses to select a particular resource pool. This setting may be provided through a signal to be broadcast or a terminal specific dedicated signal.

In addition, the network can set which priorities the terminal applies to select a specific resource pool. For example, the network, through a flag indicating that the terminal priority is used, a flag indicating that the destination terminal group priority is used, it may be set whether a specific resource pool should be selected based on which one of the terminal priority, and the destination group priority. When setting based on the terminal priority, more specifically, it may set for the terminal to select the resource pool based on which one of the terminal priority/terminal group priority, and terminal data priority the terminal should select. The network may set this through a broadcast signal or a terminal specific dedicated signal.

The priority of the group to which the terminal belongs can be set by the NAS signal or the OAM. The group priority of the potential groups may be informed to the base station. The group priority may be used when the network prioritizes terminal groups. The group priority may be used, when giving priority to communication associated with a group of relatively higher priority. The group priority may be used by the terminal or by the network. The terminal can perform D2D transmission for a specific group. The terminal may perform D2D transmission for a plurality of groups.

Hereinafter, specific examples of selecting a specific resource pool based on the step S152 of FIG. 15, i.e., the priority in terms of terminal and the priority of the resource pool will be described.

As described above, the priority information of each resource pool can be provided in the form of an index. If the index indicates the priority of a terminal group that is allowed to use a particular resource pool, then it may indicate a group priority used to determine terminals of one or more groups that can use that resource pool. If the index indicates a priority of data allowed to the terminal, then it may indicate one or more data priorities that can use the resource pool.

As a first method in which the D2D transmission belonging to a specific priority selects a transmission resource pool, the D2D transmission belonging to a specific priority can be transmitted using a transmission resource pool associated with the same priority.

As another method, if the priority of the D2D transmission is higher than or equal to the priority indicated by the index of the resource pool, then the corresponding D2D transmission may be allowed to use the resource pool. That is, the D2D transmission having a priority higher than or equal to a priority indicated by an index of a specific resource pool is allowed to use the specific resource pool. If the priority of the D2D transmission is lower than the index of the specific resource pool, then the terminals belonging to the terminal group are not allowed to use the specific resource pool.

As another method, if the priority of the D2D transmission is equal to or lower than the index of the resource pool, then the corresponding D2D transmission may be allowed to use the resource pool. That is, the D2D transmission having a priority equal to or lower than a priority indicated by an index of a specific resource pool is allowed to use the specific resource pool.

Figure 16:
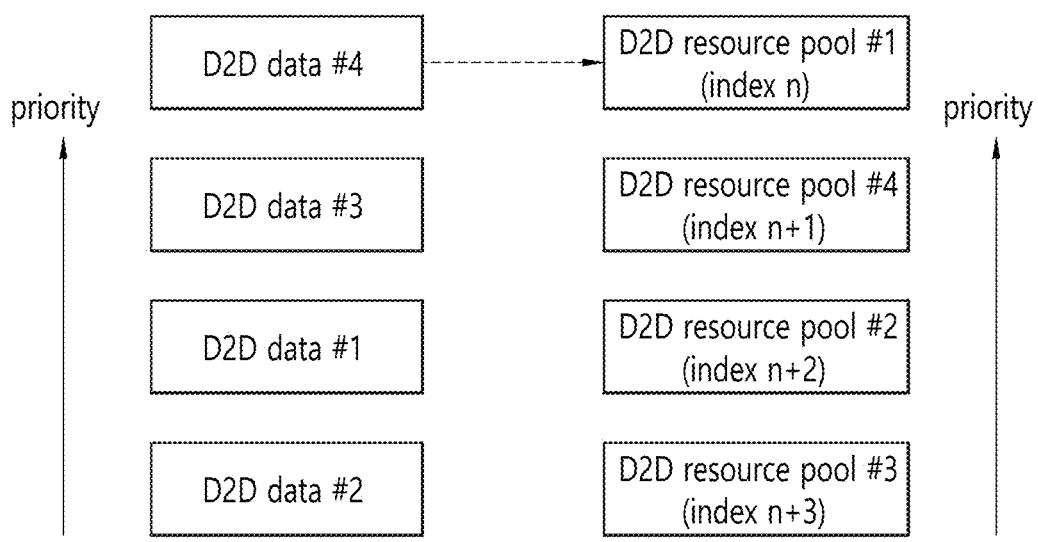
FIG. 16 shows an example of a method of selecting a specific resource pool in consideration of the priority indicated by the index of the resource pool and the priority of in terms of the terminal.

FIG. 16 shows an example of a method of selecting a specific resource pool in consideration of the priority indicated by the index of the resource pool and the priority of in terms of the terminal.

Referring to FIG. 16, the UE has D2D data #1,2,3 4 to be transmitted and may have a higher priority in order of D2D data #4,3,1,2. For example, D2D data #4 has the highest priority as D2D data for public safety, and D2D data #2 has the lowest priority as general data among terminals.

The network provides D2D resource pools #1, 2, 3, 4, index n for D2D resource pool #1, index n+1 for D2D resource pool #4, index n+2 for D2D resource pool #2, and index n+3 for D2D resource pool #3 may be provided. Suppose that the lower the index is, the higher the priority is. Then, D2D resource pools #1, 4, 2, 3 have higher priority in that order. The lower the probability of interference is and the better the channel quality is in a D2D resource pool, the higher the priority can be set. In this case, the UE can transmit the D2D data #4 having the highest priority through the D2D resource pool #1 having the highest priority.

Meanwhile, if an index of a resource pool is not provided for a particular resource pool, any priority D2D transmission may be allowed to use that resource pool. Or only terminals belonging to a particular group or a particular priority or D2D transmissions with a particular priority may be allowed to use that resource pool. To this end, the UE can be configured through the OAM or NAS signal to determine which group can use the resource pool.

The index of each resource pool provided by the network may represent the class of the resource pool. The class of the resource pool can be used to determine which terminal or terminal group of an access class can use the resource pool.

For example, the class of a resource pool can be divided into two. That is, it can be divided into two classes as a high class and a normal class. The high class may indicate that the resource pool is available only to terminals having a high access class. The normal class may indicate that the resource pool is available to all the terminals having the high access class and the normal access class.

Figure 17:
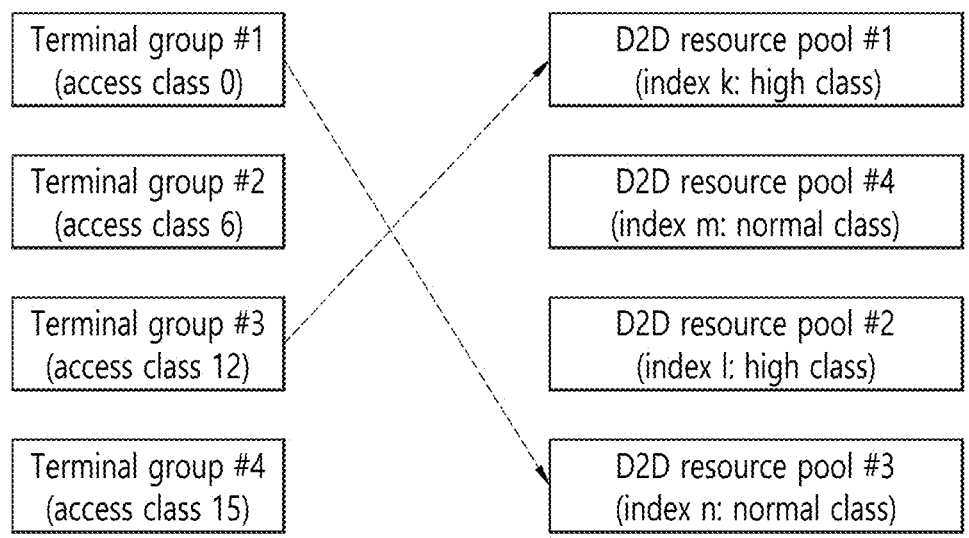
FIG. 17 shows an example of a method of selecting a specific resource pool in consideration of a class indicated by an index of a resource pool and an access class that is a priority in terms of the terminal.

FIG. 17 shows an example of a method of selecting a specific resource pool in consideration of a class indicated by an index of a resource pool and an access class that is a priority in terms of the terminal.

Referring to FIG. 17, suppose that a terminal group #1 is an access class 0 (AC 0), a terminal group #2 is an access class 6 (AC 6), a terminal group #3 is an access class 12 (AC 12), and a terminal group #4 is an access class is 15 (AC 15). Access classes 0 to 9 are normal access classes, and access classes 11 to 15 are high access classes. If the terminal belongs to the access classes AC 0 to 9, then the terminal regards itself as a normal access class and can only use the resource pool of the normal class. On the other hand, if the terminal belongs to the access classes AC 11-15, then the terminal regards itself as a high access class, and can use both the normal class and the high class resource pools, or can use the high class resource pool.

Suppose that an index k indicating a high class is given to the D2D resource pool #1, an index m indicating a normal class is given to the D2D resource pool #4, and an index 1 indicating a high class is given to the D2D resource pool #2, and an index n indicating the normal class is given to the D2D resource pool #3.

In this case, since the terminal belonging to the terminal group #1 corresponds to the access class 0 belonging to the normal access class, and thus only the resource pools of the normal class among the D2D resource pools, that is, the D2D resource pools #3 and 4, can be used. On the other hand, since the terminal belonging to the terminal group #3 corresponds to the access class 12 belonging to the high access class, all the D2D resource pools can be used. In FIG. 17, a case has been exemplified in which the terminal group #3 uses the D2D resource pool #1, which is a resource pool of high class.

That is, if a class of a resource pool is provided by an index by the network, then the terminal is allowed to use a resource pool having an index indicating a high class, as long as the terminal belongs to the high access class. The terminal belonging to the high access class is also allowed to use a resource pool having an index indicating the normal class.

Alternatively, if the terminal belongs to the high access class, the terminal may use only resource pools having indices indicating the high classes, and may not be able to use resource pools having indices indicating the normal class.

If the terminal belongs to the normal access class, then the terminal can use only the resource pool having the index indicating the normal class. The terminal may not be allowed to use a resource pool having an index indicating the high class.

If an index of the resource pool is not provided, then it can be determined that the terminal belonging to any class can use the resource pool.

In the previous example, the class of a resource pool is divided into the high class and the low class, and the class of a resource pool may be divided into a public safety class and a non-public safety class. Or if the class of the resource pool indicates the high class, then this may represent that it is the resource pool that can be used for public safety, and if the class of the resource pool indicates the normal class, then this may represent that it is the resource pool that can be used for non-public safety.

When the terminal is a terminal belonging to a class for public safety, then the terminal may be allowed to use the resource pool indicating a class of the high class or public safety among resource pools. The terminal may also be allowed to use the resource pool having an index indicating the non-public safety class or the normal class. Alternatively, the terminal may use only a resource pool having an index indicating the high class or the class for the public safety among resource pools, and it is not allowed a resource pool having an index indicating the non-public safety class or the normal class to be used.

When the terminal is a terminal belonging to the non-public safety class, then the terminal can be allowed to use a resource pool having an index indicating the normal class or the non-public safety class among resource pools. This terminal may not be allowed to use resource pools with indices which indicate the high class or public safety class.

It is possible for the network to signal resources by distinguishing between a pool of public safety resources and a pool of non-public safety resources. In this case, priority or class may be signaled for each resource pool. The terminal selects a transmission resource using the above-described method depending on the type of traffic generated and the importance of traffic.

If an index of the resource pool is not provided, then it can be determined that the terminal of any class can use the resource pool.

Hereinafter, a method of transmitting information on a priority (priority, which may be referred to as priority) by a terminal that transmits a D2D signal will be described. Here, an object for the priority (or prioritization) may be varied. In other words, what is prioritized may vary. For example, the priority may be a priority for a terminal group that the terminal is interested in performing the D2D action. If UE #1 is most interested in performing D2D actions with terminals belonging to A group and then interested in performing D2D actions with terminals belonging to B group, then a priority is applied in a manner that higher priority is given to the A group, and then giving priority to the B group.

Or the priority may be for the data that the terminal transmits through the D2D action. For example, the data that the terminal desires to transmit through the D2D action may be data by an emergency call that requires urgency, and there may be general user data that does not require emergency than the emergency call. In addition, among various applications that users use, there may be data whose priority should be treated differently, such as whether a real-time response is required or not.

It may be desirable for the terminal to provide information on the priority (prioritization) to the network, whether the priority is for the terminal group or for the data.

Figure 18:
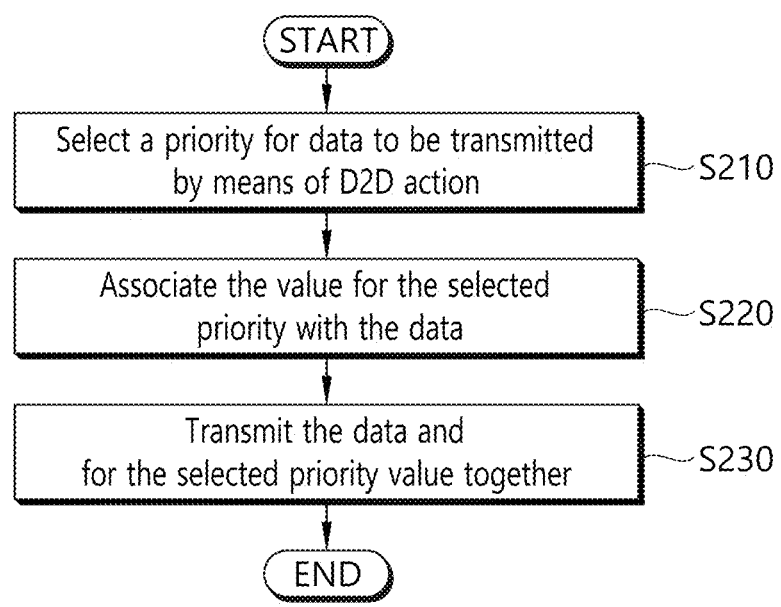
FIG. 18 shows a method of transmitting priority information of a terminal supporting D2D action according to an embodiment of the present invention.

FIG. 18 shows a method of transmitting priority information of a terminal supporting D2D action (operation) according to an embodiment of the present invention.

Referring to FIG. 18, the terminal selects a priority for data to be transmitted through the D2D action (S210). For example, the terminal can select a priority in packet data units to be transmitted through the D2D action. This action can be performed on an upper layer (e.g., an application layer) of the terminal.

The terminal associates a value for the selected priority with the data (S220).

For example, the value for priority can be comprised of a total of eight values from 1 to 8, and a lower number can represent a higher priority. For example, a lower number may be associated with packet data corresponding to an emergency call, and a higher number may be associated with other packet data. This process can also be referred to as a process of mapping a priority associated with the data.

The terminal transmits the selected priority value and the data together (S230). The terminal transmits the data and the priority value by the D2D action. That is, the data included in the message transmitted through the PC 5 interface is transmitted together with a corresponding priority value. Data and priority value transmission may be performed on a lower layer of the terminal. The terminal may also transmit the selected priority value and/or data to a network.

Even when D2D data is transmitted to the same target terminal, each packet data unit comprising of the D2D data may have different priorities. For example, the priority value may be included in a PDU (MAC PDU) generated by the MAC layer. In MAC PDUs in which data of different priorities are multiplexed, the highest priority among the priorities of the data included in the MAC PDU can be regarded as the priority of the MAC PDU. That is, the highest priority among the priorities of the included data is indicated in the MAC PDU in which data of different priorities are multiplexed. As an another method, fields in the MAC subheader existing in the MAC header of the MAC PDU in which data of different priorities are multiplexed may indicate the priority of the MAC SDU corresponding to the corresponding MAC subheader. Alternatively, a method of indicating the priority of data by adding a field indicating the priority of the PDCP SDU in the PDCP header is also possible. Priority can be given to each packet data unit based on importance/emergency/purpose, and so on, and it is possible to transmit using the resource depending on the priority value, thereby facilitating QoS (Quality of Service) to be guaranteed.

Although a priority is described for the data to be transmitted through the D2D action in FIG. 18, it can also be applied to the priority (prioritization) for the terminal group.

According to the prior art, the terminal can not know whether the network supports the priority related function. For example, the terminal can not know whether the network supports a function related to group priority. Therefore, the terminal can not determine whether to inform the network of the group priority. For example, it can not know whether or not to prioritize transmission by the terminal should be informed to the network.

Supporting group priority may be supported in both RRC idle state and RRC connection state depending on the setting, or may be supported only in RRC connection state. The terminal may be required to determine whether it should be in the RRC connection state or the RRC idle state in order to utilize the function related to the group priority FIG. 19 shows a method of transmitting priority (prioritization) information of a terminal according to an embodiment of the present invention.

Figure 19:
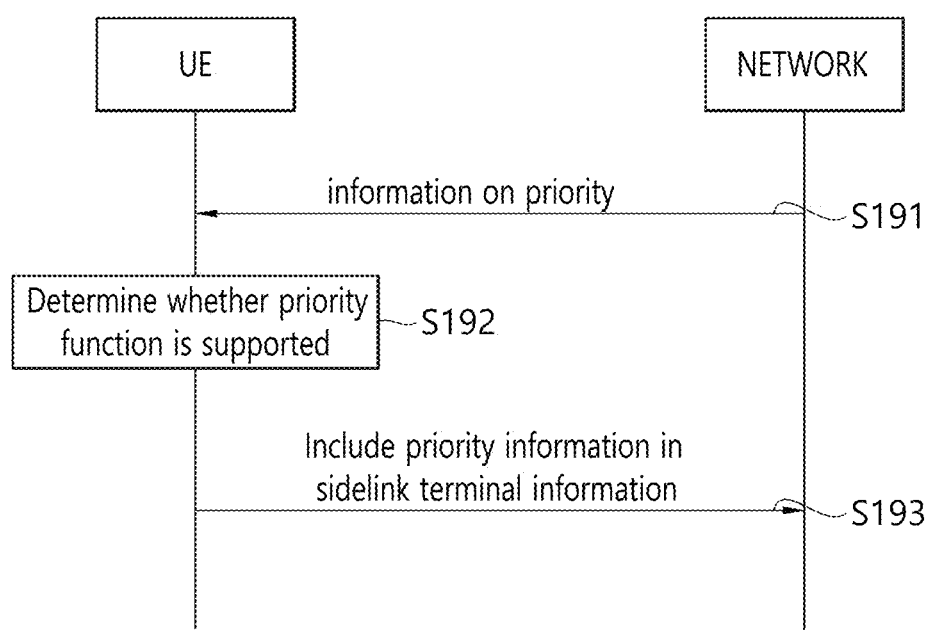
FIG. 19 shows a method of transmitting priority (prioritization) information of a terminal according to an embodiment of the present invention.

Referring to FIG. 19, the network may inform the terminal whether or not it supports the priority-related function (S191). For example, the network may inform whether or not it supports a function related to group priority.

The functions related to the group priority may include at least one of the following.

1) Each transmission resource pool is associated with a priority. If the transmission resource pool is broadcast, then the group priority function is applied to the RRC idle state and can also be applied to the RRC connection state.

2) The terminal selects a transmission resource based on the group priority. For example, the terminal may select a transmission resource pool based on group priority.

3) The network may prioritize scheduling for sidelink transmissions of higher priority terminals.

4) The terminal can notify when the group priority of the group which is interested in transmission is changed.

5) The terminal can inform when the group priority of the group to which the terminal belongs is changed.

The terminal can determine whether the network supports the priority function (S192). For example, the terminal may determine whether the network supports the group priority function.

The terminal may determine that the network supports the group priority function, if any of the following conditions are satisfied.

<Alt 1>: When the network broadcasts system information for the corresponding D2D action and signals an indicator that the group priority function is supported.

For example, the network may broadcast SIB 18 for D2D communication. In this case, the terminal can determine that the network supports the group priority function in both the RRC idle state and the RRC connected state.

The network may broadcast an indicator indicating that it supports the group priority function. In this case, the terminal can determine that the network supports the group priority function in both the RRC idle state and the RRC connected state. The network may inform an indicator indicating that it supports the group priority function through a dedicated signal. In this case, the terminal can determine that the network supports the group priority function in the RRC connection state.

The network may signal information indicating which one of the RRC idle state and the RRC connected state supports the group priority function.

<ALT 2>: When the network broadcasts system information for the corresponding D2D action and indicates priority information applicable to the corresponding D2D action.

The priority information may be included in the system information for the corresponding D2D action. In this case, the terminal can determine that the network supports the group priority function in both the RRC idle state and the RRC connected state.

The Applicable priorities may be indicated for each transmission resource pool.

The priority information may be signaled through a dedicated signal. In this case, the terminal regards that the group priority function can be supported only in the RRC connection state.

The network may signal information indicating which state of the RRC idle state and the RRC connected state supports the group priority function.

If the terminal determines that the network supports the priority function (e.g., group priority function), then the terminal may transmit to the network by including the group priority information in sidelink terminal information (S193).

Further, the terminal can regard that the group priority information which is already included can be updated.

Further, it can be regarded that the group priority information can be included in the sidelink buffer status report (BSR) or the group priority information which is already included can be updated.

It can be regarded that the emergency group/private call can be instructed to be occurred in the sidelink terminal information. The emergency group/private call may be, for example, an MCPTT emergency call. Or it may be an emergency V2X message/call. The V2X message may be a message transmitted to at least one of other vehicles, the internet, the terminal, and the devices installed on the roadside.

It can be considered that the occurrence of the emergency group/private call can be indicated in the sidelink buffer status report. The emergency group/private call may be, for example, an MCPTT emergency call.

It can be regarded that it is possible to indicate to the sidelink terminal information that the priority for that group is temporarily increased to the highest priority.

It is regarded that the sidelink buffer status report can indicate that the priority for that group has temporarily been raised to the highest priority.

If the terminal determines that the network does not support the group priority function, then it is regarded that it is not allowed to include or indicate the information.

If the network supports the group priority function only in the RRC connection state and the terminal is in the current RRC idle state and the UE desires to prioritize the emergency call, then the terminal may trigger a step of the RRC connection establishment. The step of RRC connection establishment may be the result of triggering a service request at the NAS layer.

Meanwhile, when an emergency occurs, for example, when an emergency situation occurs in which a user of the terminal is seriously injured or feels a threat in life, the terminal may want to inform the situation through MCPTT (Mission Critical Push-To-Talk) to other person. Such notifications (e.g., MCPTT emergency alarms, MCPTT emergency group calls, MCPTT emergency personal calls, etc.) may be required to have an increased priority (prioritization) to acquire resources. Members belonging to the same group may be also required to have priority in acquiring resources to handle the emergency situation. In the case of an emergency message in transmission such as an inter-vehicle safety message such as an MCPTT as well as an inter-vehicle safety message, the terminal determines that it is in an emergency and may consider notifying to the network for acquiring transmission priority.

Currently, the base station does not know the updated group priority of the group. In this case, the present invention may be applied. That is, the updated priority information of the group can be informed based on the reporting of the terminal.

Figure 20:
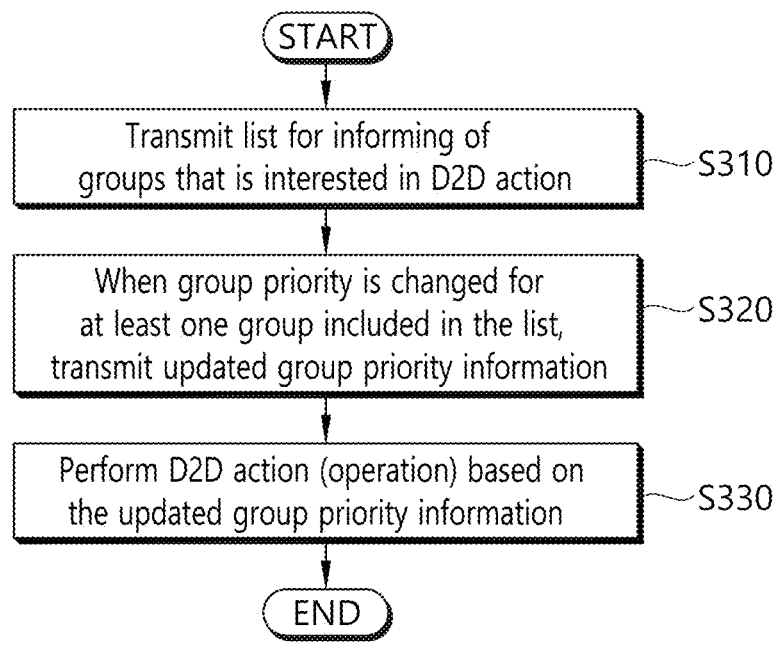
FIG. 20 shows a method of transmitting priority information of a terminal according to another embodiment of the present invention.

FIG. 20 shows a method of transmitting priority information of a terminal according to another embodiment of the present invention.

Referring to FIG. 20, for a terminal list informing other terminal that is interested in performing a D2D action (e.g., transmitting a D2D signal) or a group list informing a group that the terminal is interested in performing a D2D action, it may be notified to the network (S310). Hereinafter, description will be made based on an example of informing the group list.

The group priority of at least one group included in the group list can be changed. For example, due to emergency group calls which are required to be prioritized over a normal group call, it may be required for the group priorities of the groups included in the group list to be updated. Or the occurrence of an MCPTT emergency alert, an MCPTT emergency group call, an MCPTT emergency private call, etc., may require updating the group priority of the groups included in the group list. Through updating the group priority, the terminal can change some group as a group priority higher than the original group priority.

If the group priority of at least one group included in the list is changed, then the updated group priority information is transmitted (S320).

That is, due to the group priority change, the terminal transmits the updated group priority information. The group priority information indicates at least one of: 1) an updated priority value; 2) that the corresponding group now has the highest priority (this can be informed by 1-bit information), and 3) the group has an emergency call/priority (this can be informed by 1-bit information).

The updated group priority information may be provided in the form of {an ID of the corresponding group, the new priority value}, or may be provided in the form of {an one-bit indicator indicating the ID of the corresponding group, the highest priority or the priority for the emergency situation}. The corresponding group may be a destination to which the terminal transmits the D2D data, i.e., a target, and may include one or a plurality of terminals.

Or each bit corresponds to a group signaled in the 'SL-DestinationInfoList' in a bit string of the same size as the 'SL-DestinationInfoList' which is already indicated by the terminal. Each bit can indicate that the corresponding group now has the highest importance/emergency call/priority.

The terminal performs the D2D action based on the updated group priority for the corresponding group (S330). For example, the terminal may select a transmission resource pool based on the updated group priority. Alternatively, the terminal can select a D2D group (a group to be subjected to the D2D action) for the sidelink grant based on the updated group priority.

The updated group priority may be temporarily valid. For example, if the update of the group priority is occurred by an emergency group call, then the priority of the group call can be returned to the original group priority value at the end of the emergency call. It may serve as a signaling overhead to notify the network again that it has been changed to the original group priority value. In order to reduce the signaling overhead, when the terminal transmits the updated group priority information, the terminal can notify the time interval to which the updated group priority information is applied together. The timer associated with the time interval may start when transmitting a message including the time interval. When the timer expires, the terminal can return the priority of the corresponding group to the original group priority value. Upon receipt of the information indicating the time interval, the base station can regard that the updated group priority for the corresponding group is valid only in the time interval. After the time interval has elapsed, the base station may regard that the group priority for the corresponding group is the same as the original group priority.

In LTE-A Rel 12, group priority issues has been discussed in terms of transmission resource handling. If a group priority is associated with a transmission resource, then the group priority affects the transmission resource selection. Therefore, it is also preferable that the LTE-Rel 13 basically follow the requirements of the LTE-A Rel 12.

There may be two methods for prioritization of transmission resources based on group priority.

A first method is a method of selecting a transmission resource based on a priority of a group to which a terminal transmits data and a second method is a method of selecting a transmission resource based on a priority of a group to which the terminal that transmits data is belonged. That is, the first method is based on the priority (prioritization) of the group receiving the data, and the second method is based on the priority (prioritization) of the group transmitting the data.

In the first method, transmissions for the group with the highest priority can potentially be prioritized. This method is the basic method discussed in LTE-A Rel 12. In the second method, transmissions from the group with the highest priority can potentially be prioritized. The second method may require an announcement requesting that members of different groups with different priorities be prioritized.

<Group Priority for Base Station Scheduling>

In the resource allocation scheduled by the base station, if the base station knows the priority of the group (i.e., the group to receive data) in which the scheduled terminal desires to send data, then the first method can be implemented. Currently, such group priority information is not informed to the base station.

In order to implement the second method, the base station should know the priority of the group to which the terminal belongs. The current base station does not know the group to which the terminal belongs and does neither know the priority of the group.

The base station can determine the priority of the corresponding group by one of the following two methods.

The first method is for the terminal to inform the base station of the group priority information through the sidelink terminal information.

The second method is for the base station to acquire the group priority information through the ProSe function.

The first method requires the terminal to dynamically report group priority information to the base station. The terminal may transmit the sidelink terminal information including the group priority information to the base station when transmitting the sidelink terminal information. The terminal can update the group priority information and report it again in exceptional cases such that the group priority information is changed unexpectedly.

The second method may require that the base station determines the group priority of the corresponding group, or the base station is provided with group priority information of all groups in advance. This can be determined depending on the provision policy of the group priority information.

It is assumed that the base station can receive group priority information by another network node, e.g., a terminal.

<Group Priority for Resource Selection of Terminal>

In resource allocation selected by the terminal, different transmission resource pools may be associated with one or more group priorities. Then, different transmission resource pools may be selected depending on the priority of data transmitted by the mobile station. The group priority information may be provided to the terminal through the PC3 interface.

<Group Selection for Transmission>

For the received sidelink grant, the terminal preferentially transmits data with high priority. To this end, data of the highest priority group is preferentially transmitted among the plurality of groups waiting for transmission. This may mean that data to be transmitted through a logical channel corresponding to a group having a high priority is preferentially considered in multiplexing. Unlike this, it may be left to the terminal implementation to decide which group to select and to transmit which logical channel in the selected group. It is related to both the transmission scheduled by the base station, i.e. mode 1 and the transmission selected by the terminal, i.e. mode 2

Figure 21:
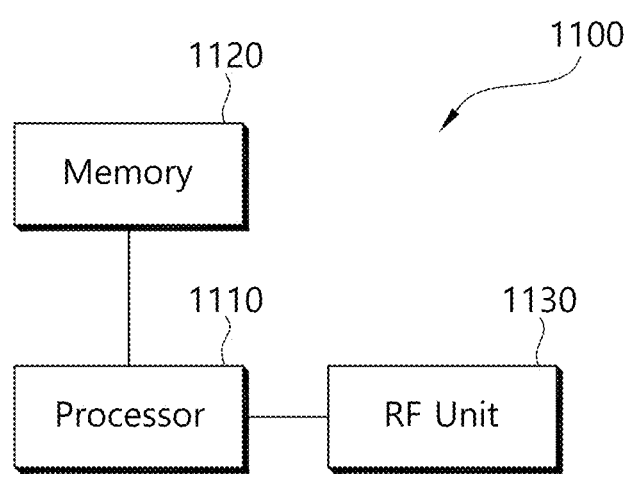
FIG. 21 is a block diagram illustrating a terminal in which an embodiment of the present invention is implemented.

In the description related to FIG. 20, the notification of the group priority and related information has been exemplified and the group priority information of the above description may replaced with the priority of an individual terminal or individual data, and thus may be applicable to an example on priority information of an individual terminal or transmitting priority of individual data FIG. 21 is a block diagram illustrating a terminal in which an embodiment of the present invention is implemented.

Referring to FIG. 21, a UE 1100 includes a processor 1110, a memory 1120, and an RF unit (radio frequency unit) 1130. The processor 1110 implements the proposed functionality, process and/or method.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method, performed by a user equipment (UE), for transmitting priority information in a wireless communication system, the method comprising:

transmitting, to a network, a group list informing UE groups that the UE is interested in performing a device-to-device (D2D) operation, wherein the group list includes priority information informing a group priority of each group included in the group list;

selecting a data priority for data to be transmitted by means of the D2D operation;

associating a value for the selected data priority with the data; and transmitting, to a group having a highest group priority in the UE groups, the data and the value for the selected data priority, wherein, when a group priority of any one group included in the group list is changed due to a predetermined cause, the UE transmits, to the network, a value for the changed group priority of the any one group and 1-bit information informing the any one group has a highest group priority.

2. The method of claim 1,
wherein the data and the value for the selected data priority are transmitted to other terminal by the D2D operation.

3. The method of claim 1,
wherein the value for the selected data priority is transmitted to the network.

4. The method of claim 1, wherein the data priority is selected as a packet data unit.

5. The method of claim 1, wherein the value for the data priority is selected among a plurality of values.

6. The method of claim 1, wherein, when the data priority for the data is changed, a value for the changed data priority is transmitted to the network.

7. The method of claim 1, wherein, when the any one group comprises UEs related to vehicle-to-everything (V2X) communication, the group priority of the any one group is changed.

8. A user equipment (UE) comprising:

a radio frequency (RF) unit configured to transmit and receive a radio signal; and a processor coupled to the RF unit, wherein the processor transmits, to a network, a group list informing UE groups that the UE is interested in performing a device-to-device (D2D) operation, wherein the group list includes priority information informing a group priority of each group included in the group list, selects a data priority for data to be transmitted by means of the D2D operation, associates a value for the selected data priority with the data, and transmits, to a group having a highest group priority in the UE groups, the data and the value for the selected data priority, wherein, when a group priority of any one group included in the group list is changed due to a predetermined cause, the UE transmits, to the network, a value for the changed group priority of the any one group and 1-bit information informing the any one group has a highest group priority.

9. The UE of claim 8,
wherein the data and the value for the selected data priority are transmitted to other UE by the D2D operation.

10. The UE of claim 8,
wherein the value for the selected data priority is transmitted to the network.

11. The UE of claim 8,
wherein the data priority is selected as a packet data unit.

12. The UE of claim 8, wherein the value for the data priority is selected among a plurality of values.

13. The UE of claim 8, wherein, when the data priority for the data is changed, a value for the changed data priority is transmitted to the network.

14. The UE of claim 8, wherein, when the any one group comprises UEs related to vehicle-to-everything (V2X) communication, the group priority of the any one group is changed.

* * * * *